United States Patent [19]

Tayama et al.

[11] Patent Number: 5,494,645
[45] Date of Patent: Feb. 27, 1996

[54] PROCESS FOR PRODUCING ABRASION-RESISTANT SYNTHETIC RESIN MOLDED ARTICLES

[75] Inventors: Suehiro Tayama, Hiroshima; Misao Tamura; Tsukasa Mizobuchi, both of Aichi, all of Japan

[73] Assignee: Mitsubishi Rayon Co., Ltd., Tokyo, Japan

[21] Appl. No.: 498,435

[22] Filed: Jul. 5, 1995

Related U.S. Application Data

[62] Division of Ser. No. 982,726, Nov. 27, 1992, Pat. No. 5,449,702.

[51] Int. Cl.⁶ .................... B05D 3/06; C08F 2/48
[52] U.S. Cl. .............. 427/508; 427/393.5; 427/510; 427/558
[58] Field of Search ............... 427/393.5, 508, 427/510, 558; 522/4, 64, 79, 83, 173

[56] References Cited

U.S. PATENT DOCUMENTS

| | | | |
|---|---|---|---|
| 4,006,271 | 2/1977 | French et al. | 427/164 |
| 4,348,462 | 9/1982 | Chung | 428/412 |
| 4,455,205 | 6/1984 | Olson et al. | 428/412 X |
| 4,491,508 | 1/1985 | Olson et al. | 528/26 X |
| 4,526,920 | 7/1985 | Sakashita et al. | 524/850 |
| 4,591,522 | 5/1986 | Kang et al. | 428/419 |
| 5,127,834 | 7/1992 | Hasegawa et al. | 433/202.1 |
| 5,162,390 | 11/1992 | Tilley et al. | 522/64 |
| 5,214,085 | 5/1993 | Patel et al. | 524/102 |
| 5,260,256 | 11/1993 | Takahara et al. | 503/227 |

*Primary Examiner*—Michael Lusignan
*Attorney, Agent, or Firm*—Oblon, Spivak, McClelland, Maier & Neustadt

[57] ABSTRACT

Disclosed is a coating composition comprising (A) 5 to 60 parts by weight, on a solid basis, of colloidal silica, (B) 5 to 70 parts by weight of a hydrolyzate and/or hydrolyzed and partially condensed product of a compound of the general formula

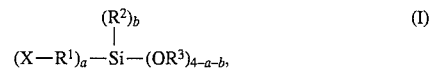

(C) 10 to 80 parts by weight of a polyfunctional monomer containing a monomer of the general formula

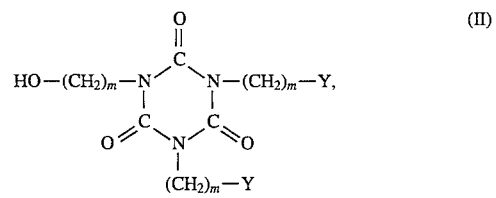

and (D) 0.01 to 5 parts by weight of a photopolymerization initiator containing a compound of the general formula

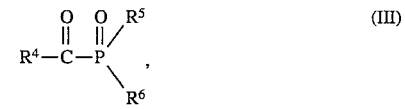

provided that the combined amount of components (A), (B), (C) and (D) is 100 parts by weight.

This coating composition can be cured in air by exposure to ultraviolet light, and the resulting cured film is excellent in various properties (such as abrasion resistance) and adhesion to the substrate.

4 Claims, No Drawings

PROCESS FOR PRODUCING ABRASION-RESISTANT SYNTHETIC RESIN MOLDED ARTICLES

This is a Division of application Ser. No. 07/982,726, filed on Nov. 27, 1992, now U.S. Pat. No. 5,449,702, patented Sep. 12, 1995.

BACKGROUND OF THE INVENTION

1. Field of the Invention

This invention relates to coating compositions which, when applied to substrate surfaces and exposed to actinic radiation in air, can form a crosslinked and cured film having excellent abrasion resistance, surface smoothness, thermal resistance, chemical resistance, durability, weather resistance and adhesion to the substrate, and to a process for producing abrasion-resistant synthetic resin molded articles by using such a coating composition.

2. Description of the Prior Art

Synthetic resin molded articles formed of polymethyl methacrylate resin, polymethacrylimide resin, polycarbonate resins, polystyrene resin and AS resin have lighter weight and higher impact resistance than glass products. Moreover, they have high transparency and can be shaped easily. Owing to these various advantages, they have recently come to be used in a wide variety of applications including automobile plastic parts.

On the other hand, the surfaces of such synthetic resin molded articles do not have sufficient abrasion resistance, so that they are subject to damage as a result of contact with other harder objects, friction, scratching and the like. Since any damage caused to the surfaces of such synthetic resin molded articles diminishes their commercial value significantly and/or makes them unusable in a short period of time, it is strongly desired to improve the abrasion resistance of their surfaces. Moreover, where they are used as automobile parts, their weather resistance is also regarded as essential.

In order to overcome the above-described disadvantages of synthetic resin molded articles, various attempts have heretofore been made. For example, U.S. Pat. No. 4,006,271 discloses a method for improving the abrasion resistance of synthetic resin molded articles wherein a coating material comprising a partially hydrolyzed and condensed product of a silane mixture composed chiefly of an alkyltrialkoxysilane and colloidal silica is applied to the surface of a synthetic resin molded article and then heated to form a crosslinked and cured film. Although a high degree of abrasion resistance can be achieved by this method, the resulting film tends to have insufficient adhesion to the surface of the molded article. In order to enhance this adhesion, it is necessary to use an acrylic polymer or a silicone as a primer. This is disadvantageous in that a complicated treating procedure is required. Moreover, the curing time is so long that economic losses and low productivity result.

In order to overcome these disadvantages, U.S. Pat. No. 4,348,462 discloses a method of making abrasion-resistant synthetic resin molded articles wherein an ultraviolet-curing coating material comprising colloidal silica, an alkoxysilane having a methacryloyl or glycidyl functional group, and a non-silyl acrylate is applied to the surface of a synthetic resin molded article and then exposed to ultraviolet light. In addition, U.S. Pat. No. 4,491,508 discloses the use of a coating composition comprising colloidal silica, a hydrolyzate of a silyl acrylate, a polyfunctional acrylate and a photopolymerization initiator and containing essentially no organic solvent. These methods involve the use of ultraviolet light for curing purposes and have the advantage that the long curing time which has heretofore been encountered with silicone-based coating films can be reduced markedly. Moreover, they are highly effective in improving the abrasion resistance of synthetic resin molded articles.

Of the above-described methods, however, the former one can enhance productivity, but has the disadvantage that the durability and weather resistance of the resulting cured film are less than satisfactory. Moreover, a complicated treating procedure is still required because the surfaces of synthetic resin molded articles must be undercoated with a primer composition prior to application of the coating composition. The latter method, which uses essentially no organic solvent, the coating film formed by applying the coating composition to a synthetic resin molded article has poor surface smoothness and tends to develop surface defects such as cissing and pinholes. Moreover, the properties of the cured film are reduced after being subjected to a hot water resistance test, a thermal cycling test or a weather resistance test. Furthermore, the above-described prior-art methods have the additional disadvantage that, owing to the properties of the monomers used, the coating composition must be cured in an atmosphere of nitrogen and cannot be cured in air.

SUMMARY OF THE INVENTION

It is a first object of the present invention to provide a coating composition which, when applied to substrate surfaces and cured in air, can form a crosslinked and cured film having excellent abrasion resistance, surface smoothness, thermal resistance, chemical resistance, durability, weather resistance and adhesion to the substrate.

It is a second object of the present invention to provide a process for producing abrasion-resistant synthetic resin molded articles which permits a cured film having excellent properties as described above to be formed on a surface of a synthetic resin molded article in air, in simple process steps, and in a short period of time.

The above-described first object of the present invention is accomplished by the provision of a coating composition comprising (A) 5 to 60 parts by weight, on a solid basis, of colloidal silica, (B) 5 to 70 parts by weight of a hydrolyzate and/or hydrolyzed and partially condensed product of a compound of the general formula

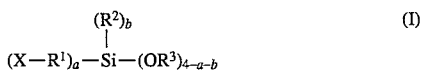

$$(X-R^1)_a-Si(R^2)_b-(OR^3)_{4-a-b} \quad (I)$$

where X is $CH_2\!=\!CH\!-\!COO\!-\!$, $CH_2\!=\!C(CH_3)\!-\!COO\!-\!$ or $CH_2\!=\!CH\!-\!$, $R^1$ is a direct bond or an alkylene group having 1 to 8 carbon atoms, $R^2$ and $R^3$ are alkyl groups having 1 to 8 carbon atoms, a is a whole number of 1 to 3, b is a whole number of 0 to 2, and (a+b) has a value of 1 to 3, (C) 10 to 80 parts by weight of a polyfunctional monomer having two or more (meth)acryloyloxy groups in the molecule, the polyfunctional monomer containing 20% by weight or more of a monomer of the general formula

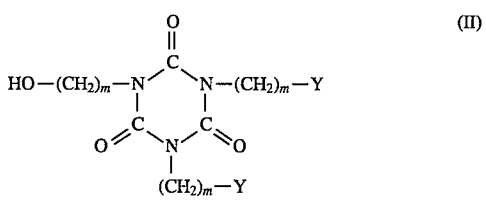

where at least one of the Y is CH$_2$=CH—COO— or CH$_2$=C(CH$_3$)—COO— and the other is CH$_2$=CH—COO—(CH$_2$)$_n$—OCO— or CH$_2$=C(CH$_3$)—COO—(CH$_2$)$_n$—OCO—, and m and n are whole numbers of 1 to 8, and (D) 0.01 to 5 parts by weight of a photopolymerization initiator containing 60% by weight or more of a compound of the general formula

where $R^4$, $R^5$ and $R^6$ independently represent phenyl groups, substituted phenyl groups, benzyl groups, substituted benzyl groups, alkyl groups of 1 to 8 carbon atoms, or alkoxy groups of 1 to 8 carbon atoms, provided that the combined amount of components (A), (B), (C) and (D) is 100 parts by weight.

The above-described second object of the present invention is accomplished by the provision of a process for producing abrasion-resistant synthetic resin molded articles which comprises the steps of applying a coating composition in accordance with the present invention to a surface of a synthetic resin molded article, and forming a crosslinked and cured film on the surface of the synthetic resin molded article by exposure to ultraviolet light.

DESCRIPTION OF THE PREFERRED EMBODIMENTS

The present invention is more specifically described hereinbelow. First of all, the various components constituting the coating compositions of the present invention are explained in greater detail.

The colloidal silica used as component (A) can be an ultrafine colloidal solution of silicic acid anhydride. Alternatively, colloidal silica in the form of powder not suspended in a dispersion medium can also be used in the coating compositions of the present invention.

Colloidal silica can significantly improve the abrasion resistance of the cured film and is particularly effective in improving its abrasion resistance to fine particles such as sand. However, when a synthetic resin molded article is coated with colloidal silica alone, the resulting coating film has poor adhesion to the surface of the synthetic resin molded article.

The dispersion media which can used for colloidal silica include water; alcohol solvents such as methanol, ethanol, isopropanol, n-propanol, isobutanol and n-butanol; polyhydric alcohol solvents such as ethylene glycol; polyhydric alcohol derivatives such as ethyl cellosolve and butyl cellosolve; ketone solvents such as methyl ethyl ketone, methyl isobutyl ketone and diacetone alcohol; and monomers such as 2-hydroxyethyl acrylate, 2-hydroxypropyl acrylate and tetrahydrofurfuryl acrylate. These dispersion media may be directly added, as colloidal solutions, to the coating compositions of the present invention. Among the above-described dispersion media, organic solvents are preferred to water because they facilitate the formation of a coating film and have greater dissolving power for the monomer component (C). Especially preferred are alcohol solvents.

Such colloidal silica can be produced according to well-known processes or is commercially available. Its average particle diameter is preferably in the range of 1 to 200 nm and more preferably in the range of 5 to 80 nm. If the average particle diameter is less than 1 nm, the silica particles are unstable in the dispersion medium and the quality of the resulting coating compositions tends to be variable. If the average particle diameter is greater than 200 nm, the resulting cured film tends to show a reduction in transparency.

Component (A) is used in an amount of 5 to 60 parts by weight, preferably 10 to 40 parts by weight, per 100 parts by weight of the combined amount of components (A) to (D). If the amount of component (A) is less than 5 parts by weight, the resulting cured film does not have sufficient abrasion resistance. If the amount of component (A) is greater than 60 parts by weight, the resulting cured film is subject to cracking and tends to produce cracks after being tested for durability and weather resistance. Moreover, the resulting cured film shows a reduction in thermal resistance.

The hydrolyzate and/or hydrolyzed and partially condensed product of the alkoxysilane compound of the general formula (I), used as component (B), serves to improve the compatibility between the colloidal silica used as component (A) and the monomer of the general formula (II) used in component (C). The use of the compound of the general formula (I) which has an acryloyl, methacryloyl or vinyl group and exhibits polymerization activity on exposure to ultraviolet light permits the formation of a chemical bond between such groups and the two or more (meth)acryloyloxy groups possessed by the monomer used as component (C) and thereby impart toughness to the cured film. Moreover, the combined use of colloidal silica as component (A) can further improve the abrasion resistance of the cured film and is particularly effective in improving its abrasion resistance to metal fibers such as steel wool.

Specific examples of the compound of the general formula (I) include 3-methacryloyloxypropyltrimethoxysilane, 3-acryloyloxypropyltrimethoxysilane, 2-methacryloyloxyethyltrimethoxysilane, 2-acryloyloxyethyltrimethoxysilane, 3-methacryloyloxypropyltriethoxysilane, 3-acryloyloxypropyltriethoxysilane, 2-methacryloyloxyethyltriethoxysilane, 2-acryloyloxyethyltriethoxysilane, 3-methacryloyloxypropylmethyldimethoxysilane, 3-acryloyloxypropylmethyldimethoxysilane, vinyltrimethoxysilane and vinyltriethoxysilane. The hydrolyzate and/or hydrolyzed and partially condensed product used as component (B) can be obtained, for example, by adding 0.5 to 6 moles of a 0.001 to 0.1N aqueous solution of an acid (such as hydrochloric acid or acetic acid) to 1 mole of at least one alkoxy silane compound as described above, and stirring the resulting mixture at room temperature.

Preferred examples of the compound of the general formula (I) are 3-methacryloyloxypropyltrimethoxysilane, 3-acryloyloxypropyltrimethoxysilane, 3-methacryloyloxypropyltriethoxysilane, 3-acryloyloxypropyltriethoxysilane, vinyltrimethoxysilane and vinyltriethoxysilane.

Component (B) is used in an amount of 5 to 70 parts by weight, preferably 10 to 40 parts by weight, per 100 parts by weight of the combined amount of components (A) to (D). If the amount of component (B) is less than 5 parts by weight, the resulting cured film does not have sufficient transparency, toughness and abrasion resistance. If the amount of component (B) is greater than 70 parts by weight, the resulting cured film shows a reduction in abrasion resistance and toughness.

The polyfunctional monomer having two or more (meth-)acryloyloxy groups in the molecule and containing 20% by weight or more of a monomer of the general formula (II), used as component (C), serves to improve the transparency, toughness and abrasion resistance of the resulting cured film without reducing its abrasion resistance. If only components (A) and (B) are used to form a cured film, its abrasion resistance is excellent, but its transparency is insufficient. Moreover, such a cured film tends to produce cracks and other defects. If the polyfunctional monomer used as component (C) does not contain a monomer of the general formula (II), the resulting cured film does not have sufficient durability and weather resistance. Moreover, the resulting coating composition cannot be cured in air. Accordingly, it is essential that component (C) contain 20% by weight or more of a monomer of the general formula (II). Preferably, component (C) contains 60% by weight of a monomer of the general formula (II). Of course, component (C) may consist entirely of a monomer of the general formula (II).

Specific examples of the monomer of the general formula (II) include bis(2-acryloyloxyethyl)hydroxyethyl isocyanurate, bis(2-acryloyloxypropyl)hydroxypropyl isocyanurate, bis(2-acryloyloxybutyl) hydroxybutyl isocyanurate, bis(2-acryloyloxyhexyl) hydroxyhexyl isocyanurate, bis(2-acryloyloxyoctyl) hydroxyoctyl isocyanurate, bis(2-methacryloyloxyethyl) hydroxyethyl isocyanurate, bis(2-methacryloyloxypropyl) hydroxypropyl isocyanurate, bis(2-methacryloyloxybutyl) hydroxybutyl isocyanurate, bis(2-methacryloyloxyhexyl) hydroxyhexyl isocyanurate and bis(2-methacryloyloxyoctyl) hydroxyoctyl isocyanurate.

A preferred example of the monomer of the general formula (II) is bis(2-acryloyloxyethyl) hydroxyethyl isocyanurate.

Specific examples of the polyfunctional monomer having two or more (meth)acryloyloxy groups in the molecule, other than the monomer of the general formula (II), include difunctional monomers such as 1,6-hexanediol diacrylate, 1,4-butanediol diacrylate, neopentyl glycol diacrylate, neopentyl glycol hydroxypivalate diacrylate and urethane acrylate; and trifunctional or higher polyfunctional monomers such as trimethylolpropane triacrylate, pentaerythritol triacrylate, tris(acryloyloxyethyl) isocyanurate, ditrimethylolpropane tetraacrylate, pentaerythritol tetraacrylate, dipentaerythritol pentaacrylate and dipentaerythritol hexaacrylate. Among these polyfunctional monomers, 1,6-hexanediol diacrylate, 1,4-butanediol diacrylate, neopentyl glycol diacrylate, trimethylolpropane triacrylate, pentaerythritol triacrylate, pentaerythritol tetraacrylate and dipentaerythritol pentaacrylate are preferred.

Component (C) is used in an amount of 10 to 80 parts by weight, preferably 30 to 60 parts by weight, per 100 parts by weight of the combined amount of components (A) to (D). If the amount of component (C) is less than 10 parts by weight, the resulting cured film does not have sufficient toughness, thermal resistance and weather resistance. If the amount of component (C) is greater than 80 parts by weight, the resulting cured film shows a reduction in abrasion resistance.

The compound of the general formula (III) contained in component (D) is an acylphosphine oxide type photopolymerization initiator. In order to apply a colloidal silica-containing coating composition to the surface of a synthetic resin molded article and cure the coating film uniformly to the inside by exposure to ultraviolet light, it is necessary to use an acylphosphine oxide type photopolymerization initiator having a maximum absorption band in the wavelength range of 350 to 400 nm. The reason for this is that, if a conventional photopolymerization initiator having a maximum absorption band in the wavelength range of 300 to 360 nm is added to a colloidal silica-containing coating composition and the latter is exposed to ultraviolet light, the surface layer of the coating film can be cured but the cure of its inside is insufficient, thus creating a layered structure in the coating film, and the difference in polymerization rate between the surface layer and inside of the coating film induces cracking and cohesive failure due to internal stresses.

In order to impart abrasion resistance to the cured film, conventional photopolymerization initiators such as benzophenone, methyl phenyl glyoxylate, benzyl dimethyl ketal and benzoin isopropyl ether can also be used in component (D). However, it is essential that component (D) contain 60% by weight or more of a compound of the general formula (III), i.e., an acylphosphine oxide type photopolymerization initiator.

Specific examples of the compound of the general formula (III) include 2,4,6-trimethylbenzoyldiphenylphosphine oxide, 2,4,6-trimethylbenzoylethoxyphenylphosphine oxide, 2,4,6-trimethylbenzoyldiethoxyphosphine oxide, 2,4,6-trimethylbenzoyldimethoxyphosphine oxide, 2,4,6-trimethylbenzoylmethoxyphenylphosphine oxide, 2,4,6-trimethylbenzoylisopropoxyphenylphosphine oxide and 2,4,6-trimethylbenzoyldiisopropoxyphosphine oxide.

Among the foregoing compounds, 2,4,6-trimethylbenzoyldiphenylphosphine oxide is most preferred because it imparts good curability to the coating film and the compound itself is stable.

Other conventional photopolymerization initiators having a maximum absorption band in the wavelength range of 350 to 400 nm include benzil, 2-chlorothioxanthone, 2,4-diethylthioxanthone, 2,4-diisopropylthioxanthone and the like. These compounds cannot be used in combination with components (A), (B) and (C) because the resulting cured film is colored.

Component (D) is used in an amount of 0.01 to 5 parts by weight, preferably 0.5 to 3 parts by weight, per 100 parts by weight of the combined amount of components (A) to (D). If the amount of component (D) is less than 0.01 part by weight, the resulting coating composition does not have sufficient curability. If the amount of component (D) is greater than 5 parts by weight, the resulting cured film suffers a coloration and shows a reduction in weather resistance.

In a preferred embodiment, the coating compositions of the present invention additionally contain an ultraviolet absorber (E) and a hindered amine type light stabilizer (F).

No particular limitation is placed on the type of the ultraviolet absorber used as component (E), and there may be used any ultraviolet absorber that can be homogeneously dissolved in the coating composition and imparts good weather resistance thereto. However, ultraviolet absorbers derived from benzophenone, benzotriazole, phenyl salicylate and phenyl benzoate and having a maximum absorption band in the wavelength range of 240 to 380 nm are preferred because they have good solubility in the coating composition and are effective in improving its Weather resistance. Among others, ultraviolet absorbers derived from benzophenone are especially preferred in that the coating composition can contain them in large amounts, and ultraviolet absorbers derived from benzotriazole are especially preferred in that they can prevent substrate materials such as polycarbonate from yellowing. Thus, it is most preferable to use these two types of ultraviolet absorbers in combination.

Specific examples of component (E) include 2-hydroxybenzophenone, 5-chloro-2-hydroxybenzophenone, 2,4-dihydroxybenzophenone, 2-hydroxy-4-methoxybenzophenone, 2-hydroxy-4-octyloxybenzophenone, 4-dodecyloxy-2-hydroxybenzophenone, 2-hydroxy-4-octadecyloxybenzophenone, 2,2'-dihydroxy-4-methoxybenzophenone, 2,2'-dihydroxy-4,4'-dimethoxybenzophenone, phenyl salicylate, p-tert-butylphenyl salicylate, p-(1,1,3,3-tetramethylbutyl)phenyl salicylate, 3-hydroxyphenyl benzoate, phenylene-1,3-dibenzoate, 2-(2-hydroxy-5-methylphenyl)benzotriazole, 2-(2-hydroxy-5-tert-butylphenyl)-2H-benzotriazole, 2-(2-hydroxy-3,5-di-tert-butylphenyl)-5-chlorobenzotriazole, 2-(2-hydroxy-3,5-di-tert-butylphenyl)benzotriazole and 2-(2-hydroxy-5-tert-octylphenyl)-2H-benzotriazole. Among others, 2-hydroxy-4-octoxybenzophenone and 2,4-dihydroxybenzophenone, which are derived from benzophenone, and 2-(2-hydroxy-5-tert-butylphenyl)-2H-benzotriazole, which is derived from benzotriazole, are especially preferred. These ultraviolet absorbers are more preferably used in admixture of two or more.

Component (E) is used in an amount of 0.1 to 20 parts by weight, preferably 1 to 10 parts by weight, per 100 parts by weight of the combined amount of components (A) to (D). If the amount of component (E) is less than 0.1 part by weight, the resulting cured film may not have sufficient weather resistance and may fail to effectively protect the substrate from ultraviolet radiation. If the amount of component (E) is greater than 20 parts by weight, the coating film may not be cured completely and the resulting cured film may show a reduction in toughness, thermal resistance and abrasion resistance.

The hindered amine type light stabilizer used as component (F), in cooperation with the ultraviolet absorber used as component (E), serves to further improve the weather resistance of the cured film. Specific examples of component (F) include bis(1,2,2,6,6-pentamethyl-4-piperidyl) sebacate, bis(2,2,6,6-tetramethyl-4-piperidyl) sebacate and bis(1,2,2,6,6-pentamethyl-4-piperidyl) 2-(3,5-di-t-butyl-4-hydroxybenzyl)-2-n-butylmalonate. Among others, bis(1,2,2,6,6-pentamethyl-4-piperidyl) sebacate and bis(2,2,6,6-tetramethyl-4-piperidyl) sebacate are especially preferred.

Component (F) is used in an amount of 0.1 to 5 parts by weight, preferably 0.5 to 2 parts by weight, per 100 parts by weight of the combined amount of components (A) to (D). If the amount of component (F) is less than 0.1 part by weight, the resulting cured film may not have sufficient weather resistance and durability. If the amount of component (F) is greater than 5 parts by weight, the coating film may not be cured completely and the resulting cured film may show a reduction in toughness, thermal resistance and abrasion resistance.

If necessary, the coating compositions of the present invention can contain, in addition to the above-described components (A), (B), (C), (D), (E) and (F), various additives such as organic solvents, antioxidants, anti-yellowing agents, bluing agents, pigments, leveling agents, anti-foaming agents, thickening agents, anti-settling agents, antistatic agents and anti-fogging agents according to the need. The organic solvent used should be chosen according to the type of the substrate material. Moreover, the type and amount of organic solvent added to the coating compositions of the present invention (containing components (A) to (D) as essential components) should preferably be such that the viscosity of the resulting coating composition is lower than that of the monomer of the general formula (II) alone. Where polycarbonate is used as the substrate material, it is desirable to use an alcohol solvent (such as isobutanol), an ester solvent (such as n-butyl acetate or diethylene glycol acetate) and a cellosolve solvent (such as ethyl cellosolve) in combination. The organic solvent may be used in an amount of 20 to 800 parts by weight per 100 parts by weight of the coating composition.

In order to apply the coating compositions of the present invention to substrates, there may be employed a variety of techniques such as brushing, spray coating, dip coating, spin coating and curtain coating. It is preferable to apply them with the aid of an organic solvent so that the application properties of the coating composition, the smoothness and uniformity of the coating film, and the adhesion of the cured film to the substrate may be improved.

After the coating compositions of the present invention are applied to substrates, they are preferably crosslinked by exposure to actinic radiation to form a cured film. In order to cure the coating compositions of the present invention by exposure to actinic radiation, they are applied to substrates so as to give a coating thickness of 1 to 30 μm and preferably 3 to 10 μm, and then exposed to ultraviolet light (in the wavelength range of 100 to 400 nm) from a high-pressure mercury vapor lamp or metal halide lamp so as to provide an energy of 1,000 to 5,000 mJ/cm$^2$. The atmosphere for exposure to ultraviolet light may be air, and it is unnecessary to use an inert gas (such as nitrogen or argon) on purpose.

Since the coating compositions of the present invention contain a compound of the general formula (III), i.e., an acylphosphine oxide type photopolymerization initiator, it is particularly important to expose them effectively to ultraviolet light in the wavelength range of 350–400 nm. For example, it is preferable to effect a first exposure to ultraviolet light having an adequate radiant energy in the wavelength range of 350–400 nm and then a second exposure to ultraviolet light having a substantial radiant energy in the wavelength range of 200–250 nm. More specifically, the first exposure may be effected by using a metal halide lamp emitting ultraviolet light in which the ratio of the radiant energy in the wavelength range of 350–400 nm to the radiant energy at a wavelength of 365 nm is 2–10/1, and the second exposure may be effected by using a high-pressure mercury vapor lamp emitting ultraviolet light in which the ratio of the radiant energy in the wavelength range of 200–250 nm to the radiant energy at a wavelength of 365 nm is 0.1–1/1. This exposure process can further improve the transparency, abrasion resistance, durability and weather resistance of the cured film, as well as its adhesion to the substrate comprising a synthetic resin molded article.

After the coating compositions of the present invention are applied to the surfaces of synthetic resin molded articles and before they are cured by means of the radiant energy of ultraviolet light, they may be heat-treated at 20° to 120° C. for 1 to 60 minutes by exposure to infrared radiation or in a hot-air drying oven in order to improve the adhesion of the cured film to the substrate.

The coating compositions of the present invention can be used to improve the surface quality of various synthetic resin molded articles constituting substrates. Such synthetic resin molded articles include those formed of various thermoplastic and thermosetting resins of which an improvement in abrasion resistance, weather resistance and other properties has heretofore been demanded. Specific examples of such materials include polymethyl methacrylate resin, polycarbonate resins, polyester resins, polystyrene resin, ABS resins, acrylonitrile-styrene copolymer resin, polyamide resins, polyarylate resins, polymethacrylimide resin and poly(allyl diglycol carbonate) resin. Among others, polymethyl methacrylate resin, polycarbonate resins, polystyrene resin and polymethacrylimide resin can be effectively used as substrate materials for the coating compositions of the present invention because they have high transparency and are faced with a strong demand for an improvement in abrasion resistance. The term "synthetic resin molded articles" denotes a variety of molded articles formed of these resins, including sheet-like molded articles, film-like molded articles, various injection-molded articles and the like.

The present invention is more specifically explained with reference to the following examples. In these examples, the cured films were evaluated according to the following procedures.

1. Abrasion resistance

A piece of #000 steel wool (commercially available from Nippon Steel Wool Co., Ltd. under the trade name of Bonstar) was attached to a circular pad having a diameter of 25 mm, placed on the surface of a sample held on the table of a reciprocating abrasion testing machine, and moved back and forth 100 cycles under a load of 3,000 g. Thereafter, the sample was washed with a neutral detergent and its haze was measured with a hazemeter. The abrasion resistance is expressed by [(haze after abrasion)—(haze before abrasion)].

2. Adhesion

By cutting the cured film of a sample with a razor at intervals of 1.5 mm, 11 parallel cuts were made in each of two orthogonal directions so as to reach the substrate. Thus, a total of 100 squares were formed in the cured film. A strip of cellophane adhesive tape (25 mm wide; manufactured by Nichiban Co., Ltd.) was applied thereto under pressure and peeled off upward and quickly, and the number of the squares removed from the substrate was counted. The adhesion is expressed by (number of remaining squares)/(total number of squares=100).

3. Appearance (1) Transparency

Using a hazemeter, the haze (%) of a sample was measured according to ASTM D-1003. The transparency is expressed by this haze.

(2) Cracking

The cured film of a sample was visually examined and rate on the following basis:

| | |
|---|---|
| Good (O) . . . | No crack was observed. |
| Fair (Δ) . . . | Some cracks were observed. |
| Poor (X) . . . | Numerous cracks were observed. |

4. Hot water resistance

A sample was immersed in hot water at 90° C. for 3 hours. Thereafter, the sample was removed from the hot water and allowed to stand at room temperature for an hour. Then, the cured film was visually examined for transparency and cracking. Moreover, its adhesion was evaluated.

5. Weather resistance

Using a Q.U.V. (a Uv tester manufactured by Q Panel Co., Ltd.), a sample was subjected to a 1,000 hour accelerated exposure test in which each cycle consisted of exposure to ultraviolet light for 4 hours (at black panel temperature of 65° C.) and water condensation in the dark for 4 hours (at an atmosphere temperature of 45° C.). After completion of the test, the transparency of the sample was evaluated by measuring its haze with a hazemeter. Moreover, the sample was visually examined for cracking of the cured film.

EXAMPLE 1

A 300-ml beaker was charged with 70 g of 3-methacryloyloxypropyltrimethoxysilane (commercially available from Nippon Unicar Co., Ltd. under the trade name of A-174) and 15.4 g of a 0.001N aqueous solution of hydrochloric acid. This mixture was stirred at a liquid temperature of 20° C. for an hour to obtain a clear hydrolyzate of 3-methacryloyloxypropyltrimethoxysilane. This hydrolyzate was added to another vessel containing 350 g of colloidal silica (with an average particle diameter of 12 nm) dispersed in methanol so as to have a $SiO_2$ content of 30% by weight (commercially available from Nissan Chemical Industries, Ltd. under the trade name of Methanol Silica Sol). The resulting mixture was stirred at 20° C. for 4 hours and then aged by allowing it to stand for a whole day and night. This aged solution was added to another vessel containing a mixture composed of 175 g of bis(acryloyloxyethyl) hydroxyethyl isocyanurate (commercially available from Toagosei Chemical Industry Co., Ltd. under the trade name of Aronix M-215), 210 g of isopropyl alcohol, and 4.9 g of 2,4,6-trimethylbenzoyldiphenylphosphine oxide (commercially available from BASF Japan Ltd. under the trade name of Lucirin TPO). The resulting mixture was stirred at room temperature for an hour to obtain a coating composition.

Then, a 100 mm ×100 mm ×3 mm (thick) injection-molded plate made of a polymethylmethacrylate resin (commercially available from Mitsubishi Rayon Co., Ltd. under the trade name of ACRYPET VH001, color clear) was dip-coated with the above coating composition at a speed of 0.3 cm/sec to form a coating film. The coated plate was allowed to stand under ambient conditions for 10 minutes in order to flash the solvent.

Then, the coating film was cured in an atmosphere of air under the ultraviolet light exposure conditions given below. Thus, there was obtained an abrasion resistant injection-molded polymethylmethacrylate plate having a 6 μm thick cured film. The results of evaluation are shown in Table 1.

(Ultraviolet light exposure conditions)

Initially, the coated plate was exposed to ultraviolet light from a metal halide lamp (commercially available from Eye Graphics Co., Ltd. under the trade name of MO4-L22) at a distance of 20 cm from the lamp and a conveyer speed of 2 m/min. With this lamp, the ratio of the radiant energy in the wavelength range of 350–400 nm to the radiant energy at a wavelength of 365 nm was 501.6 W/132.6 W =3.78. Then, the coated plate was exposed to ultraviolet light from a high-pressure mercury vapor lamp (commercially available from Eye Graphics Co., Ltd. under the trade name of HO4-L21) at a distance of 20 cm from the lamp and a conveyer speed of 2 m/min. With this lamp, the ratio of the radiant energy in the wavelength range of 200–250 nm to the radiant energy at a wavelength of 365 nm was 57.0 W/221.0 W=0.26.

EXAMPLE 2

An aged solution was prepared in the same manner as described in Example 1. This aged solution was added to another vessel containing a mixture composed of 175 g of Aronix M-215, 180 g of isopropyl alcohol, 30 g of acetic acid, 5.0 g of Lucirin TPO and 21.0 g of 2-(2-hydroxy-5- tert-butylphenyl)-2H-benzotriazole (commercially available from Ciba-Geigy Ltd. under the trade name of Tinuvin PS). The resulting mixture was stirred at room temperature for an hour to prepare a coating composition.

Then, a 100 mm ×100 mm ×3 mm (thick) injection-molded plate made of a polycarbonate (commercially available from General Electric Company under the trade name of Lexan LS-2, color 111 clear) was dip-coated with the above coating composition at a speed of 0.3 cm/sec to form a coating film. The coated plate was allowed to stand under ambient conditions for 10 minutes in order to flash the solvent. Thereafter, the coated plate was exposed in an atmosphere of air to ultraviolet light from the same lamps as used in Example 1, but at a distance of 15 cm from each lamp and a conveyer speed of 1.5 m/min. Thus, there was obtained an abrasion-resistant injection-molded polycarbonate plate having a 5 μm thick cured film. The results of evaluation are shown in Table 1.

EXAMPLE 3

An aged solution was prepared in the same manner as described in Example 1. This aged solution was added to another vessel containing a mixture composed of 120 g of Aronix M-215, 55 g of 1,6-hexanediol diacrylate, 150 g of isopropyl alcohol, 5.0 g of Lucirin TPO and 21.0 g of Tinuvin PS. The resulting mixture was stirred at room temperature for an hour to prepare a coating composition. Using this coating composition, the procedure of Example 2 was repeated. Thus, there was obtained an abrasion-resistant injection-molded polycarbonate plate having a 6 μm thick cured film. The results of evaluation are shown in Table 1.

EXAMPLE 4

The procedure of Example 1 was repeated, except that the colloidal silica dispersed in methanol was replaced by colloidal silica dispersed in isopropyl alcohol so as to have a $SiO_2$ content of 30% by weight (commercially available from Nissan Chemical Industries, Ltd. under the trade name of Isopropanol Silica Sol). Thus, there was obtained an abrasion-resistant injection-molded polymethylmethacrylate plate having a 6.5 μm thick cured film. The results of evaluation are shown in Table 1.

EXAMPLE 5

Using the coating composition of Example 2, the procedure of Example 2 was repeated, except that the coated plate was allowed to stand at 60° C. for 10 minutes in order to flash the solvent. The results of evaluation are shown in Table 1.

Comparative Example 1

The procedure of Example 1 was repeated, except that Lucirin TPO used as the photopolymerization initiator in the coating composition of Example 1 was replaced by methyl phenylglyoxylate (commercially available from Stauffer Co., Ltd. under the trade name of Vicure 55). The results of evaluation are shown in Table 1.

Comparative Example 2

A coating composition was prepared according to the following formulation:

| | |
|---|---|
| Methanol Silica Sol | 350 g |
| Aronix M-215 | 245 g |
| Isopropyl alcohol | 210 g |
| Lucirin TPO | 4.9 g |

Using this coating composition, the procedure of Example 1 was repeated. Thus, there was obtained an abrasion-resistant injection-molded polymethylmethacrylate resin plate having a 6 μm thick cured film. The results of evaluation are shown in Table 1.

Comparative Example 3

A coating composition was prepared by adding 1.4 g of Lucirin TPO to the aged solution of Example 1. Using this coating composition, the procedure of Example 1 was repeated. Thus, there was obtained an abrasion-resistant injection-molded polymethylmethacrylate resin plate having a 5 μm thick cured film. The results of evaluation are shown in Table 1.

Comparative Example 4

A vessel was charged with 70 g of A-174 and 15.4 g of a 0.001N aqueous solution of hydrochloric acid. The resulting solution was stirred at a liquid temperature of 20° C. for an hour to obtain a clear hydrolyzate. This hydrolyzate was added to a mixture composed of 280 g of Aronix M-215, 460 g of isopropyl alcohol and 7 g of Lucirin TPO. The resulting mixture was stirred at room temperature for an hour to prepare a coating composition. Using this coating composition, the procedure of Example 1 was repeated. Thus, there was obtained an abrasion-resistant injection-molded polymethylmethacrylate resin plate having a 6 μm thick cured film. The results of evaluation are shown in Table 1.

Comparative Example 5

The aged solution of Example 1 was added to a mixture composed of 130 g of 2-hydroxyethyl acrylate, 45 g of diethylene glycol diacrylate, 210 g of isopropyl alcohol, 5.0 g of Lucirin TPO and 21.0 g of 2-(2-hydroxy-5-tert-butylphenyl)-2H-benzotriazole (Tinuvin PS). The resulting mixture was stirred at room temperature for an hour to prepare a coating composition. Using this coating composition, the procedure of Example 2 was repeated. However, the resulting cured film had not been completely cured, so that it was tacky and could not be used as an abrasion-resistant coating.

Now, Examples 6–10 using a vinyl-containing silane compound as component (B) are given together with Comparative Examples 6–11.

EXAMPLE 6

A reaction vessel comprising a 1-liter four-necked flask fitted with a stirrer and a cooling coil was charged with 250 g of colloidal silica dispersed in isopropyl alcohol so as to have a $SiO_2$ content of 30% by weight (commercially available from Nissan Chemical Industries, Ltd. under the trade name of IPA-ST). Then, 29.3 g of vinyltrimethoxysilane and 10.7 g of a 0.005N aqueous solution of hydrochloric acid were added thereto with stirring, and the resulting mixture was stirred at room temperature for an hour. To this reaction vessel was added a mixture composed of 100.7 g of bis(acryloyloxyethyl) hydroxyethyl isocyanurate and 43.2 g of 1,6-hexanediol diacrylate. The resulting mixture was stirred at room temperature for an hour. Thereafter, the reaction system was evacuated and the volatile components were distilled off at a temperature of about 40° C. As soon as the distillate became substantially undetectable, the reaction system was returned to atmospheric pressure and heated. When the reaction was performed at an internal temperature of about 80° C. under atmospheric pressure for 2 hours, there was obtained a substantially colorless and clear reacted solution having high viscosity.

Using this reacted solution, a coating composition was prepared according to the following formulation:

| | |
|---|---|
| The above reacted solution | 100 g |
| Isobutyl alcohol | 102 g |
| n-Butyl acetate | 82 g |
| Methoxybutanol | 21 g |
| Lucirin TPO | 1.2 g |
| Methyl phenyl glyoxylate | 0.4 g |
| Benzophenone | 0.4 g |
| 2-(2-Hydroxy-5-tert-butylphenyl)-2H-benzo-triazole (commercially available from Ciba-Geigy Ltd. under the trade name of Tinuvin PS) | 5 g |

Then, a 100 m ×100 m ×3 mm (thick) injection-molded plate made of the same polycarbonate as used in Example 2 was spray-coated with the above coating composition to form a coating film, and allowed to stand in a dryer at 80° C. for 10 minutes. Thereafter, the coated plate was exposed in an atmosphere of air to ultraviolet light from a high-pressure mercury vapor lamp so as to provide an energy of 2,000 mJ/cm$^2$ (as expressed by the integrated energy of ultraviolet light over the wavelength range of 320 to 380 nm). Thus, a cured film having a thickness of 7 μm was formed.

EXAMPLE 7

A 1-liter beaker was charged with 250 g of the same isopropyl alcohol-dispersed colloidal silica as used in Example 6. Then, 37.5 g of vinyltrimethoxysilane and 13.7 g of a 0.001N aqueous solution of hydrochloric acid were added thereto with stirring, and the resulting mixture was stirred at room temperature for 8 hours. After this mixture was aged by allowing it to stand overnight, 115.1 g of bis(acryloyloxyethyl) hydroxyethyl isocyanurate and 28.8 g of 1,6-hexanediol diacrylate were added thereto, and the resulting mixture was stirred at room temperature to obtain a homogeneous solution. This solution was mixed with 2.5 g of Lucirin TPO and 1.1 g of methyl phenyl glyoxylate to prepare a coating composition.

Then, a 100 m ×100 m ×3 mm (thick) injection-molded plate made of the same polymethylmethacrylate as used in Example 1 was dip-coated with the above coating composition to form a coating film, and allowed to stand in a dryer at 80° C. for 10 minutes. Thereafter, the coated plate was exposed in an atmosphere of air to ultraviolet light from a high-pressure mercury vapor lamp so as to provide an energy of 1,300 mJ/cm$^2$. Thus, a cured film having a thickness of 5 μm was formed.

EXAMPLE 8

A cured film having a thickness of 3 μm was formed in substantially the same manner as described in Example 6.

EXAMPLE 9

A cured film having a thickness of 12 μm was formed in substantially the same manner as described in Example 6.

Comparative Example 6

The reaction vessel of Example 6 was charged with 250 g of the same isopropyl alcohol-dispersed colloidal silica as used in Example 6. Then, 37.5 g of 3-methacryloyloxypropyltrimethoxysilane (commercially available from Nippon Unicar Co., Ltd. under the trade name of A-174) and 8.2 g of a 0.001N aqueous solution of hydrochloric acid were added thereto, and the resulting mixture was stirred at room temperature for 8 hours. After this mixture was aged overnight, 115.1 g of trimethylolpropane triacrylate and 28.8 g of 2-hydroxyethyl acrylate were added thereto, and the resulting mixture was stirred at room temperature to obtain a homogeneous solution. This solution was mixed with 3.6 g of diethoxyacetophenone to prepare a coating composition. Using this coating composition, a cured film having a thickness of 5 μm was formed in the same manner as described in Example 7, except that the atmosphere for exposure to ultraviolet light was altered to nitrogen.

Comparative Example 7

The coating composition of Comparative Example 6 was diluted with isopropyl alcohol. Using this diluted coating composition, a cured film having a thickness of 3 μm was formed in the same manner as described in Comparative Example 6.

Comparative Example 8

The coating composition of Comparative Example 6 was concentrated by distilling off a part of the volatiles with the aid of a rotary evaporator. Using this concentrated coating composition, a cured film having a thickness of 10 μm was formed in the same manner as described in Comparative Example 6.

Comparative Example 9

A coating composition was prepared in the same manner as described in Example 7, except that the polyfunctional monomer components [i.e., bis(acryloyloxyethyl) hydroxyethyl isocyanurate and 1,6-hexanediol diacrylate] were omitted and the amount of methyl phenyl glyoxylate added was altered to 1.5 g. Using this coating composition, a cured film having a thickness of 4 μm was formed in the same manner as described in Comparative Example 6.

Comparative Example 10

A 1-liter beaker was charged with 250 g of the same isopropyl alcohol-dispersed colloidal silica as used in Example 6, 115.1 g of bis(acryloyloxyethyl) hydroxyethyl isocyanurate, 28.8 g of 1,6-hexanediol diacrylate and 2.9 g of methyl phenyl glyoxylate. The resulting mixture was stirred at room temperature to prepare a coating composition. Using this coating composition, a cure film having a thickness of 5 μm was formed in the same manner as described in Example 7.

Comparative Example 11

A 100-ml beaker was charged with 37.5 g of vinyltrimethoxysilane, 13.7 g of a 0.001N aqueous solution of hydrochloric acid and 170 g of isopropyl alcohol, and the resulting mixture was stirred at room temperature for an hour. Then, 115.1 g of bis(acryloyloxyethyl) hydroxyethyl isocyanurate, 28.8 g of 1,6-hexanediol diacrylate and 3.6 g of methyl phenyl glyoxylate were added thereto. The resulting mixture was stirred at room temperature to prepare a coating composition. Using this coating composition, a cured film having a thickness of 5 μm was formed in the same manner as described in Example 7.

(Evaluation of the abrasion-resistant synthetic resin molded articles)

Properties of the abrasion-resistant synthetic resin molded articles obtained in the foregoing Examples 6–10 and Comparative Examples 6–11 were evaluated. The results thus obtained are shown in Table 2.

TABLE 1

|  | Abrasion resistance (%) | Adhesion | Appearance | | Hot water resistance | | Weather resistance | |
|---|---|---|---|---|---|---|---|---|
|  |  |  | Transparency (%) | Cracking | Transparency (%) | Cracking | Transparency (%) | Cracking |
| Example 1 | 0.5 | 100/100 | 0.6 | ○ | 0.7 | ○ | 1.7 | ○ |
| Example 2 | 0.7 | 100/100 | 0.8 | ○ | 0.9 | ○ | 1.8 | ○ |
| Example 3 | 0.6 | 100/100 | 0.8 | ○ | 1.0 | ○ | 1.9 | ○ |
| Example 4 | 0.4 | 100/100 | 0.6 | ○ | 0.8 | ○ | 1.8 | ○ |
| Example 5 | 0.4 | 100/100 | 0.8 | ○ | 1.0 | ○ | 2.0 | ○ |
| Comparative Example 1 | 0.5 | 25/100 | 0.7 | ○ | 12.5 | X | 8.4 | X |
| Comparative Example 2 | 3.5 | 75/100 | 0.8 | ○ | 10.3 | X | 5.0 | Δ |
| Comparative Example 3 | 0.1 | 15/100 | 4.5 | Δ | 15.0 | X | 13.0 | X |
| Comparative Example 4 | 7.5 | 100/100 | 0.8 | ○ | 1.2 | ○ | 2.5 | ○ |

TABLE 2

|  | Abrasion resistance (%) | Adhesion | Appearance | | Weather resistance | | Adhesion |
|---|---|---|---|---|---|---|---|
|  |  |  | Transparency (%) | Cracking | Transparency (%) | Cracking |  |
| Example 6 | 3.6 | 100/100 | 0.5 | ○ | 1.5 | ○ | 100/100 |
| Example 7 | 4.1 | 100/100 | 0.4 | ○ | 1.6 | ○ | 1001100 |
| Example 8 | 4.6 | 100/100 | 0.3 | ○ | 1.3 | ○ | 100/100 |
| Example 9 | 3.2 | 100/100 | 0.8 | ○ | 1.9 | ○ | 100/100 |
| Comparative Example 6 | 3.3 | 90/100 | 0.4 | ○ | 5.0 | X | 50/100 |
| Comparative Example 7 | 5.0 | 30/100 | 0.3 | ○ | 4.0 | Δ | 0/100 |
| Comparative Example 8 | 3.2 | 0/100 | 1.0 | ○ | 8.5 | X | 0/100 |
| Comparative Example 9 | — | 0/100 | 35.5 | X | — | — | — |
| Comparative Example 10 | 4.5 | 0/100 | 4.0 | ○ | 20.0 | X | 0/100 |
| Comparative Example 11 | 20.0 | 100/100 | 0.6 | ○ | 2.0 | ○ | 100/100 |

What is claimed is:

1. A process for producing an abrasion-resistant synthetic resin molded article which comprises the steps of applying a coating composition comprising (A) 5 to 60 parts by weight, on a solid basis, of colloidal silica, (B) 5 to 70 parts by weight of a hydrolyzate and/or hydrolyzed and partially condensed product of a compound of the general formula $$(X-R^1)_a-Si-(OR^3)_{4-a-b} \atop | \atop (R^2)_b \qquad (I)$$

where X is $CH_2=CH=COO-$, $CH_2=C(CH_3)-COO-$ or $CH_2=CH-$, $R^1$ is a direct bond or an alkylene group having 1 to 8 carbon atoms, $R^2$ and $R^3$ are alkyl groups having 1 to 8 carbon atoms, $a$ is a whole number of 1 to 3, $b$ is a whole number of 0 to 2, and $(a+b)$ has a value of 1 to 3, (C) 10 to 80 parts by weight of a polyfunctional monomer having two or more (meth)acryloyloxy groups in the molecule, the polyfunctional monomer containing 20% by weight or more of a monomer of the general formula

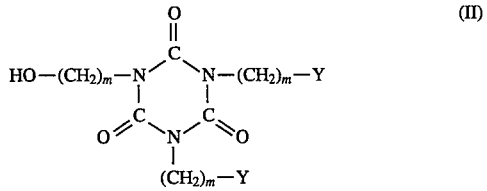

where at least one of the Y is CH$_2$=CH—COO— or CH$_2$=C(CH$_3$)—COO— and the other is CH$_2$=CH—COO—(CH$_2$)$_n$—OCO— or CH$_2$=C(CH$_3$)—COO—(CH2)$_n$—OCO—, and m and n are whole numbers of 1 to 8, and (D) 0.01 to 5 parts by weight of a photopolymerization initiator containing 60% by weight or more of a compound of the general formula

 (III)

where R$^4$, R$^5$ and R$^6$ independently represent phenyl groups, substituted phenyl groups, benzyl groups, substituted benzyl groups, alkyl groups of 1 to 8 carbon atoms, or alkoxy groups of 1 to 8 carbon atoms, provided that the combined amount of components (A), (B), (C) and (D) is 100 parts by weight to a surface of a synthetic resin molded article, and forming a crosslinked and cured film on the surface of the synthetic resin molded article by exposure to ultraviolet light.

2. A process as claimed in claim 1 wherein the crosslinked and cured film is formed by effecting a first exposure to ultraviolet light in which the ratio of the radiant energy in the wavelength range of 350–400 nm to the radiant energy at a wavelength of 365 nm is 2–10/1, and then a second exposure to ultraviolet light in which the ratio of the radiant energy in the wavelength range of 200–250 nm to the radiant energy at a wavelength of 365 nm is 0.1–1/1.

3. A process as claimed in claim 1 wherein the cured film has a thickness of 1 to 30 μm.

4. A process as claimed in claim 1 wherein the synthetic resin molded article is formed of a material selected from polymethyl methacrylate resin, polycarbonate resins and polymethacrylimide resin.

* * * * *